(12) United States Patent
Carrera Gonzalez et al.

(10) Patent No.: US 11,358,665 B2
(45) Date of Patent: Jun. 14, 2022

(54) SUPPORT FOR TWO-WHEELED VEHICLES

(71) Applicant: NICHE COMMERCE, S.L., La Garriga (ES)

(72) Inventors: Carles Carrera Gonzalez, La Garriga (ES); Carles De La Calle Girones, La Garriga (ES)

(73) Assignee: NICHE COMMERCE, S.L., La Garriga (ES)

( * ) Notice: Subject to any disclaimer, the term of this patent is extended or adjusted under 35 U.S.C. 154(b) by 55 days.

(21) Appl. No.: 16/711,746

(22) Filed: Dec. 12, 2019

(65) Prior Publication Data

US 2020/0255076 A1 Aug. 13, 2020

(30) Foreign Application Priority Data

Feb. 8, 2019 (ES) .............................. ES201930205U

(51) Int. Cl.
*B62H 3/10* (2006.01)

(52) U.S. Cl.
CPC ...................... *B62H 3/10* (2013.01)

(58) Field of Classification Search
CPC ... B62H 3/00; B62H 3/04; B62H 3/06; B62H 3/10; B62H 1/06
See application file for complete search history.

(56) References Cited

U.S. PATENT DOCUMENTS

| | | | | |
|---|---|---|---|---|
| 602,665 A * | 4/1898 | McBurney et al. | ..... | B62H 3/10 211/22 |
| 4,817,977 A * | 4/1989 | Bookbinder | ............. | B62H 1/06 180/219 |
| 4,986,557 A * | 1/1991 | Muszynski | .............. | B62H 1/06 280/298 |
| 5,358,265 A * | 10/1994 | Yaple | ........................ | B62H 1/02 280/293 |
| 5,607,173 A * | 3/1997 | Lai | ........................... | B62H 1/06 280/293 |
| 7,097,191 B2 * | 8/2006 | Griggs | ...................... | B62H 1/02 248/188.9 |
| 8,424,895 B1 * | 4/2013 | Stokes | ..................... | B62H 1/02 280/293 |
| 9,139,243 B1 * | 9/2015 | Gonzalez | ................. | B62H 3/02 |
| 10,604,123 B2 * | 3/2020 | Huang | ................ | B25H 1/0014 |
| 2008/0223800 A1 * | 9/2008 | Cole | ........................ | B62H 3/04 211/22 |

(Continued)

FOREIGN PATENT DOCUMENTS

WO 2016149803 A1 9/2016

*Primary Examiner* — Patrick D Hawn
(74) *Attorney, Agent, or Firm* — Kinney & Lange, P.A.

(57) ABSTRACT

A support for two-wheeled vehicles includes a rod which has a first end for coupling to the vehicle and a second supporting end. The rod is formed by a plurality of sections able to be coupled to one another. The sections may be hollow and include a portion with a reduced width which is introduced in an adjacent section. Support is thereby provided for two-wheeled vehicles, in particular bicycles, which allows for the easy placement and removal thereof, without the need to use tools, and which, furthermore, is universal, i.e., the support can be used on any two-wheeled vehicle. The length of the support is able to be varied in a simple way and without the need to use any tools, even allowing the user to use the same support for different vehicles.

7 Claims, 5 Drawing Sheets

(56) References Cited

U.S. PATENT DOCUMENTS

| | | | | |
|---|---|---|---|---|
| 2010/0001239 A1* | 1/2010 | Dufour | ................ | B66F 3/08 |
| | | | | 254/100 |
| 2014/0035267 A1* | 2/2014 | Moore | ................ | B62H 3/00 |
| | | | | 280/766.1 |
| 2020/0255076 A1* | 8/2020 | Carrera Gonzalez | .... | B62H 3/10 |

* cited by examiner

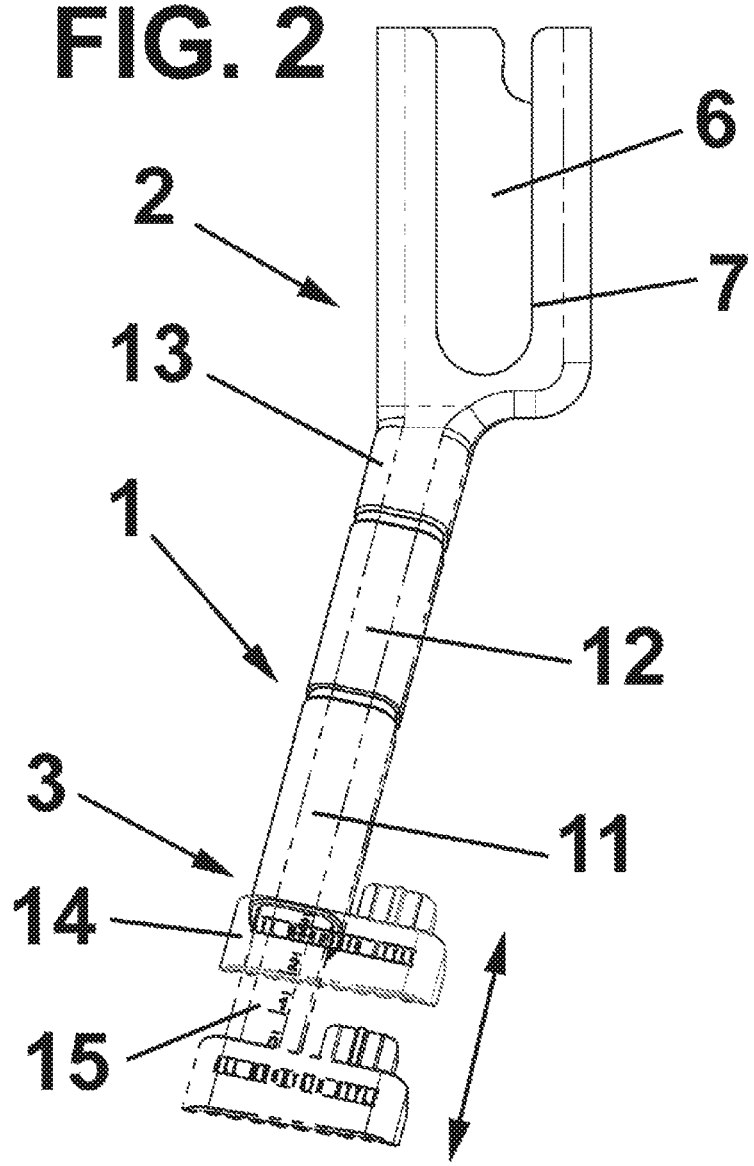

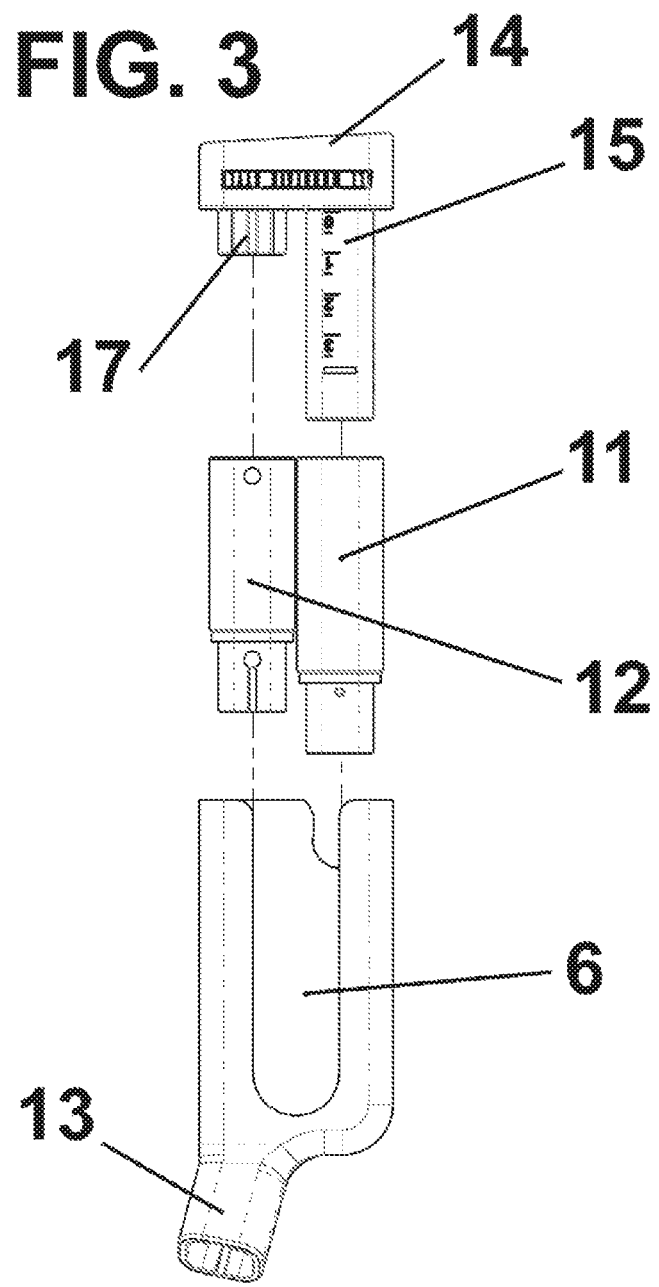

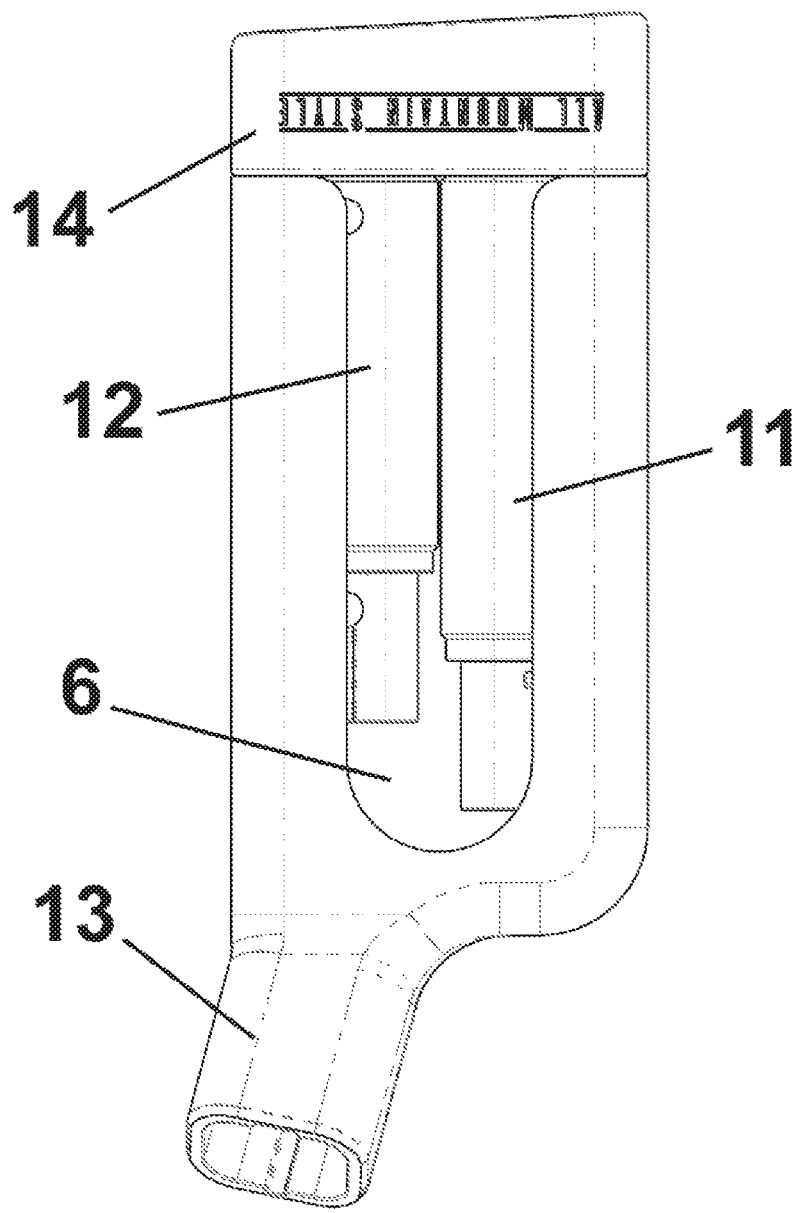

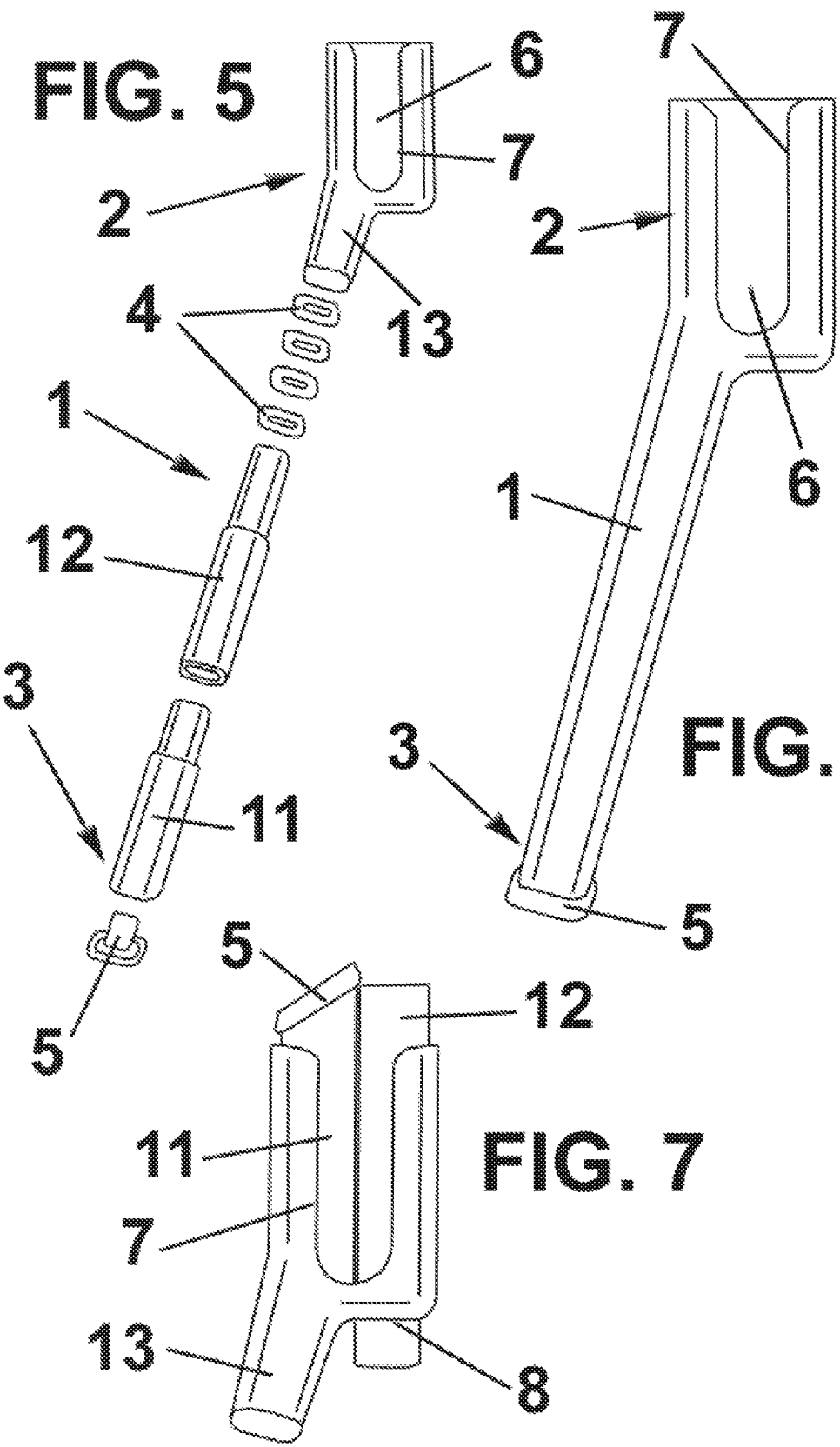

SUPPORT FOR TWO-WHEELED VEHICLES

CROSS-REFERENCE TO RELATED APPLICATION(S)

This application claims priority to Spanish Utility Model Application No. 201930205 filed on Feb. 8, 2019, the entire disclosure of which is incorporated herein by reference.

TECHNICAL FIELD

The present disclosure relates to a support for two-wheeled vehicles, in particular to a bicycle support that can be easily placed and removed without using any tools.

BACKGROUND

Two-wheeled vehicles, such as bicycles and motorcycles, comprise a hinged support to allow said vehicles to be kept substantially vertical when they are not being used.

These supports, which are fixed to the vehicle, are usually elongated and hinged to the vehicle frame at the upper end thereof, being able to be placed into a position of use, protruding from the vehicle, or in a position of rest, in which they do not protrude from the vehicle and do not affect the normal use of the vehicle.

On the other hand, supports for two-wheeled vehicles that are not fixed to the vehicle, but can rather be mounted on the vehicle, are also known.

These types of supports have the drawback in that they require the use of tools for fixing the same to the vehicle, which makes the placement and removal thereof difficult. Furthermore, they have another drawback in that the support is adapted to one type of vehicle based on the length of the support, and therefore not all supports are suitable for a specific vehicle.

As such, one object of the present disclosure is to provide a support for two-wheeled vehicles, in particular for bicycles, which allows for the easy placement and removal thereof, without the need to use tools, and which, furthermore, is universal, i.e., it can be used on any two-wheeled vehicle, the length of the support being able to vary in a simple way and without the need to use any tools, even allowing the user to use the same support for different vehicles.

SUMMARY

The support for two-wheeled vehicles of the invention resolves the aforementioned drawbacks and has other advantages which are described below.

The support for two-wheeled vehicles according to the present invention comprises a rod which comprises a first end for coupling to the vehicle and a second supporting end, wherein said rod is formed by a plurality of sections able to be coupled to one another.

Advantageously, said sections are hollow and comprise a portion with a reduced width which is introduced in an adjacent section.

For coupling to the two-wheeled vehicle, said first coupling end comprises a housing.

According to a preferred embodiment, said housing is open at the top and comprises a side window and a hole.

For example, said window can have a U-shape, or any other suitable shape.

Moreover, said rod is preferably made of plastic material, although it could be made of any suitable material.

According to one embodiment, the second end of said rod comprises a foot able to be coupled to one of the sections of said rod, in a telescopic fashion for example, which allows the length of the rod to be adjusted.

Furthermore, said rod preferably comprises a locking element that locks the foot with respect to the section to which it is coupled, defining the proper length of the rod.

According to an alternative embodiment, said rod also comprises a plurality of washers that can be placed between two adjacent sections in order to adjust the separation between the sections, thereby changing the length of the rod.

According to said alternative embodiment, said second supporting end comprises a non-slip cap.

With the support for two-wheeled vehicles according to the present invention, the placement and removal of the same is very easy, and the use of tools is not necessary.

Furthermore, the support for two-wheeled vehicles according to the present invention is universal, i.e., it can be used on any two-wheeled vehicle, the length of the support being able to vary in a simple way and without the need to use any tools, which also allows the user to use the same support for different vehicles.

BRIEF DESCRIPTION OF THE DRAWINGS

For the purpose of helping to make the foregoing description more readily understandable, the same is accompanied by a set of drawings which, schematically and by way of illustration and not limitation, represent an embodiment.

FIG. 2 is a side elevation view of the first embodiment of the support for two-wheeled vehicles according to the present invention in the mounted position, prepared for use;

FIG. 3 is a side elevation view of the pieces that form the first embodiment of the support for two-wheeled vehicles according to the present invention, right before being placed in the position of transport;

FIG. 4 is a side elevation view of a first embodiment of the support for two-wheeled vehicles according to the present invention, in the position of transport;

FIG. 5 is an exploded side elevation view of a second embodiment of the support for two-wheeled vehicles according to the present invention, wherein the pieces that make up said support can be seen;

FIG. 6 is a side elevation view of the second embodiment of the support for two-wheeled vehicles according to the present invention in the mounted position, prepared for use;

FIG. 7 is a side elevation view of a second embodiment of the support for two-wheeled vehicles according to the present invention, in the position of transport.

DETAILED DESCRIPTION OF EMBODIMENTS

Figure 1:
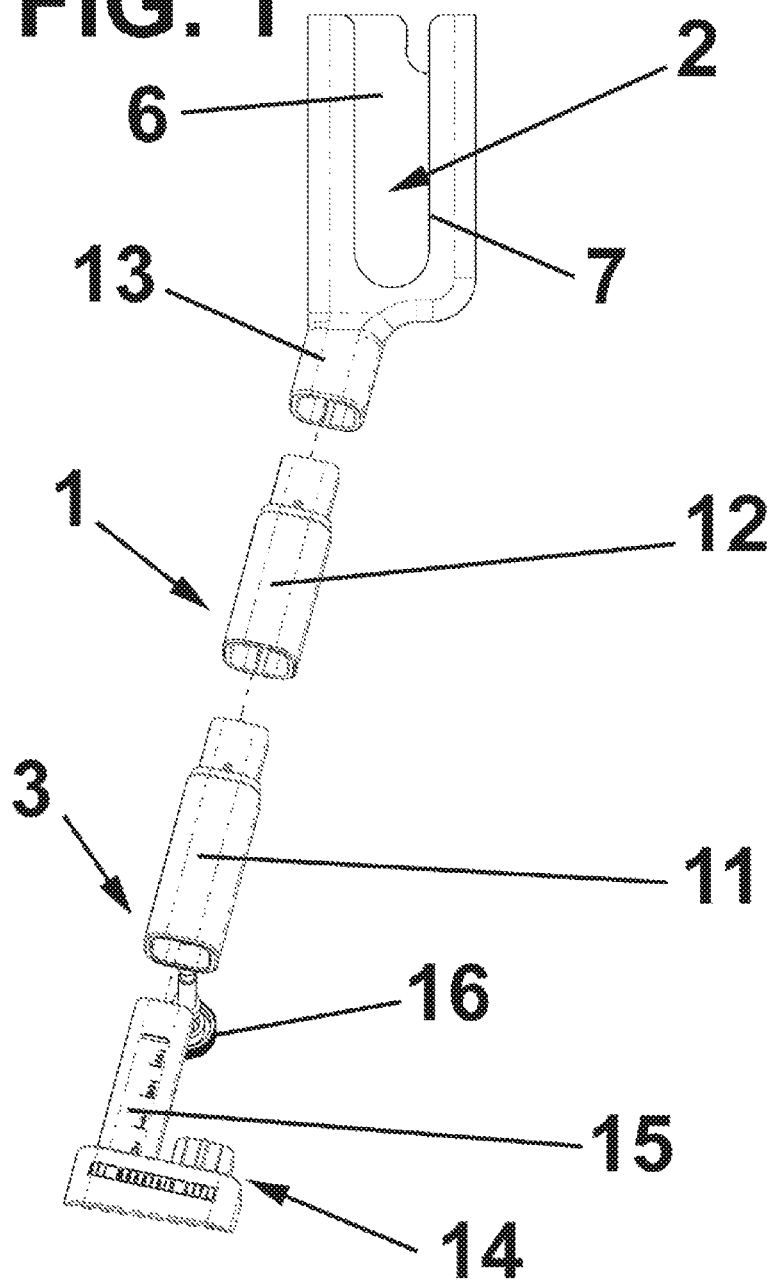
FIG. 1 is an exploded side elevation view of a first embodiment of the support for two-wheeled vehicles according to the present invention, wherein the pieces that make up said support can be seen.

As shown in FIGS. 1 to 4, the support for two-wheeled vehicles, in particular for bicycles, according to a first embodiment, comprises a rod 1 which comprises a first coupling end 2 and a second supporting end 3.

The first coupling end 2 is designed to be coupled to the vehicle, as will be explained below, and the second supporting end 3 is designed to rest on the ground.

According to the present disclosure, the rod 1 is formed by a plurality of sections 11, 12, 13 able to be coupled to one another. Preferably, said sections 11, 12, 13 are made of a plastic material and are hollow, although they could be made of any suitable material, and the coupling thereof is carried out by means of a portion that is narrower than each section, which is introduced in an adjacent section. However, it is clear that the rod 1 can be formed by any number of suitable sections able to be coupled to one another.

According to the embodiment shown, said rod 1 is formed by a lower section 11, an intermediate section 12, and an upper section 13, which is coupled to the vehicle.

Said rod 1 also comprises a foot 14 that is able to be coupled to one of the sections 11 of said rod 1.

Said foot 14 comprises a shank 15 that is telescopically housed in said section 11, allowing the length of the rod 1 to be adjusted.

Furthermore, said rod 1 preferably comprises a locking element 16 that locks the foot 14 with respect to the section 11 to which it is coupled, defining the proper length of the rod.

Said locking element 16 can be, for example, a shaft that can move between a locking position and an unlocking position by means of a knob.

The first coupling end 2 comprises a housing 6 for coupling the rod 1 to the vehicle. To do so, said housing 6 is open at the top and comprises a side window 7. Any suitable part of the vehicle can be coupled to said housing 6, such as a part of the frame, the crankset, or similar.

Said housing 6 also preferably has a second function, as can be seen in FIGS. 3 and 4, which is to house the sections 11, 12, 13 when the support is not being used, and for the transport thereof.

The use of the support according to the present invention is very simple; when the user wants to use it, the sections of the rod 1 are coupled to one another, and the length of the rod 1 is adjusted according to the features of the vehicle. This coupling is carried out without using any tools.

Once the sections of the rod 1 are coupled, the rod 1 only needs to be coupled to the vehicle by means of said housing 6.

When one no longer wants to use the support, the sections of the rod 1 simply need to be uncoupled, being able to be placed in the housing 6 for the transport thereof, occupying a reduced space.

FIGS. 5 to 7 show a second embodiment of the support according to the present invention. For reasons of simplicity, the same numerical references are used to identify the same elements. Moreover, only the differences with respect to the aforementioned first embodiment are described.

A first difference with respect to the previous embodiment is that the support according to the present invention comprises a plurality of washers 4 that can be placed between adjacent sections to adjust the separation between adjacent sections, thereby also adjusting the length of the rod 1.

Furthermore, a second difference is that the second supporting end 3 advantageously comprises a non-slip cap 5, which prevents accidental slippage, thereby facilitating the support of the vehicle.

Another difference is that the housing 6 can comprise a hole 8, in particular in the lower part thereof, through which one end of a section of the rod can protrude in order to facilitate the placement thereof in the housing 6 in the position of transport.

Despite the fact that reference has been made to a specific embodiment of the invention, it is evident for the person skilled in the art that numerous variations and changes may be made to the support for two-wheeled vehicles described, and that all the aforementioned details may be substituted by other technically equivalent ones, without detracting from the scope of protection defined by the attached claims.

The invention claimed is:

1. A support for two-wheeled vehicles, comprising:
   a rod which comprises a first end for coupling to the vehicle and a second supporting end,
   wherein the rod is formed by a plurality of sections able to be coupled to one another,
   wherein the first coupling end comprises a housing that is open at the top and comprises a U-shaped side window,
   wherein each section of the plurality of sections is hollow and comprises a portion with a reduced width relative to other portions of the section which is introduced in an adjacent section, and
   wherein the housing is configured to include a hole and to receive the sections of the rod uncoupled from one another, so that after use of the support, the uncoupled sections of the rod may be placed in the housing for transport thereof, occupying a reduced space relative to a space occupied by the sections of the rod when coupled together, wherein the second end of the rod comprises a foot able to be coupled to one of the sections of the rod and wherein the foot is telescopically coupled to one of the sections of the rod.

2. The support for two-wheeled vehicles according to claim 1, wherein the hole in the housing is configured to permit protrusion of one end of one of the sections of the rod in order to facilitate placement in the housing for transport.

3. The support for two-wheeled vehicles according to claim 1, wherein the rod is made of plastic, metal and/or fibrous material.

4. The support for two-wheeled vehicles according to claim 1, wherein the rod comprises a locking element that locks the foot with respect to the section to which it is coupled.

5. The support for two-wheeled vehicles according to claim 1, wherein the rod comprises a locking element that locks the foot with respect to the section to which it is coupled.

6. The support for two-wheeled vehicles according to claim 1, wherein the rod further comprises a plurality of washers that can be placed between two adjacent sections.

7. The support for two-wheeled vehicles according to claim 1, wherein the second supporting end comprises a non-slip cap.

* * * * *